United States Patent
Wu et al.

(10) Patent No.: US 9,798,471 B2
(45) Date of Patent: Oct. 24, 2017

(54) PERFORMANCE OF DE-CLUSTERED DISK ARRAY BY DISK GROUPING BASED ON I/O STATISTICS

(71) Applicant: EMC Corporation, Hopkinton, MA (US)

(72) Inventors: Alan Zhongjie Wu, Beijing (CN); Colin Yong Zou, Beijing (CN); Chris Zirui Liu, Beijing (CN); Fei Wang, Santa Clara, CA (US); Zhengli Yi, Beijing (CN)

(73) Assignee: EMC IP Holding Compnay LLC, Hopkinton, MA (US)

( * ) Notice: Subject to any disclaimer, the term of this patent is extended or adjusted under 35 U.S.C. 154(b) by 28 days.

(21) Appl. No.: 14/867,158

(22) Filed: Sep. 28, 2015

(65) Prior Publication Data

US 2016/0092109 A1 Mar. 31, 2016

(30) Foreign Application Priority Data

Sep. 30, 2014 (CN) .......................... 2014 1 0527708

(51) Int. Cl.
*G06F 12/00* (2006.01)
*G06F 3/06* (2006.01)
*G06F 11/10* (2006.01)

(52) U.S. Cl.
CPC ............ *G06F 3/061* (2013.01); *G06F 3/0607* (2013.01); *G06F 3/0665* (2013.01); *G06F 3/0689* (2013.01); *G06F 11/1088* (2013.01)

(58) Field of Classification Search
CPC .... G06F 11/1088; G06F 3/0607; G06F 3/061; G06F 3/0665; G06F 3/0689

USPC .......................................................... 711/114
See application file for complete search history.

(56) References Cited

U.S. PATENT DOCUMENTS

| 9,075,728 B2 * | 7/2015 | Ikeuchi ................ G06F 3/0613 |
| 2003/0182349 A1 * | 9/2003 | Leong ..................... G06F 3/061 |
| | | 718/100 |
| 2003/0182504 A1 * | 9/2003 | Nielsen ................. G06F 3/0601 |
| | | 711/114 |

(Continued)

FOREIGN PATENT DOCUMENTS

| CN | 102981973 A | * | 3/2013 |
| JP | 2001344073 A | * | 12/2001 |

*Primary Examiner* — Tuan Thai
*Assistant Examiner* — Tasnima Matin
(74) *Attorney, Agent, or Firm* — Konrad R. Lee; Krishnendu Gupta

(57) ABSTRACT

Embodiments of the present invention relate to a method and apparatus for improving performance of a de-clustered disk array by making statistics on a number and types of active input/output (I/O) requests of each of the plurality of physical disks; dividing the plurality of physical disks at least into a first schedule group and a second schedule group based on the statistic number and types of the active I/O requests of the each physical disk for a predetermined time period, the first schedule group having a first schedule priority, the second schedule group having a second schedule priority higher than the first schedule priority; and selecting, in a decreasing order of the schedule priority, a physical disk for schedule from one of the resulting schedule groups thereby preventing too many I/O requests from concentrating on some physical disks and thereby improve overall performance of a de-clustered RAID.

18 Claims, 13 Drawing Sheets

(56) References Cited

U.S. PATENT DOCUMENTS

| | | | |
|---|---|---|---|
| 2006/0004957 A1* | 1/2006 | Hand, III | G06F 12/0866 711/113 |
| 2012/0131271 A1* | 5/2012 | Araki | G06F 3/061 711/112 |
| 2013/0073825 A1* | 3/2013 | Terayama | G06F 3/0607 711/165 |

* cited by examiner

PERFORMANCE OF DE-CLUSTERED DISK ARRAY BY DISK GROUPING BASED ON I/O STATISTICS

RELATED APPLICATION

This application claims priority from Chinese Patent Application Number CN201410527708.2 filed on Sep. 30, 2014 entitled "METHOD AND APPARATUS FOR IMPROVING PERFORMANCE OF A DECLUSTERED DISK ARRAY" the content and teachings of which is herein incorporated by reference in its entirety.

DISCLAIMER

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present disclosure generally relate to information management de-clustered.

BACKGROUND OF THE INVENTION

Generally, by organizing a plurality of disks into a disk array according to a certain form and scheme, it may be possible to obtain a higher speed, better stability and larger storage capacity than with a single disk. Data reconstruction time for a disk array, for example, a Redundant Array of Independent Disks (RAID), may become longer and longer with growing disk capacity. Typically, longer reconstruction time may imply higher data loss risks.

According to statistics, for example, in DataDomain (data backup product from EMC) customer fields, there may be a number of physical disks failure cases each year in average, and 40% of these failures may cause a data loss. Typically, DataDomain RAID may use RAID-6 data protection algorithm to protect data, which may tolerate 2 physical disks failure simultaneously. However, in practice, if data reconstruction time is longer, the probability of a plurality of physical disks failure may be higher during data reconstruction period.

SUMMARY OF THE INVENTION de-clustered Embodiments of the present disclosure relate to a system, a computer program product and a method for improving performance of a de-clustered disk array comprising a plurality of physical disks, by generating statistics on a number and types of active input/output (I/O) requests of each of the plurality of physical disks; dividing the plurality of physical disks at least into a first schedule group and a second schedule group based on the statistic number and types of the active I/O requests of the each physical disk for a predetermined time period, wherein the first schedule group having a first schedule priority, the second schedule group having a second schedule priority higher than the first schedule priority; and selecting, in a decreasing order of the schedule priority, a physical disk for schedule from one of the resulting schedule groups.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limiting. In the accompanying drawings.

In the disclosure, like reference symbols in the various drawings may indicate like elements.

DETAILED DESCRIPTION OF EMBODIMENTS

Figure 1:
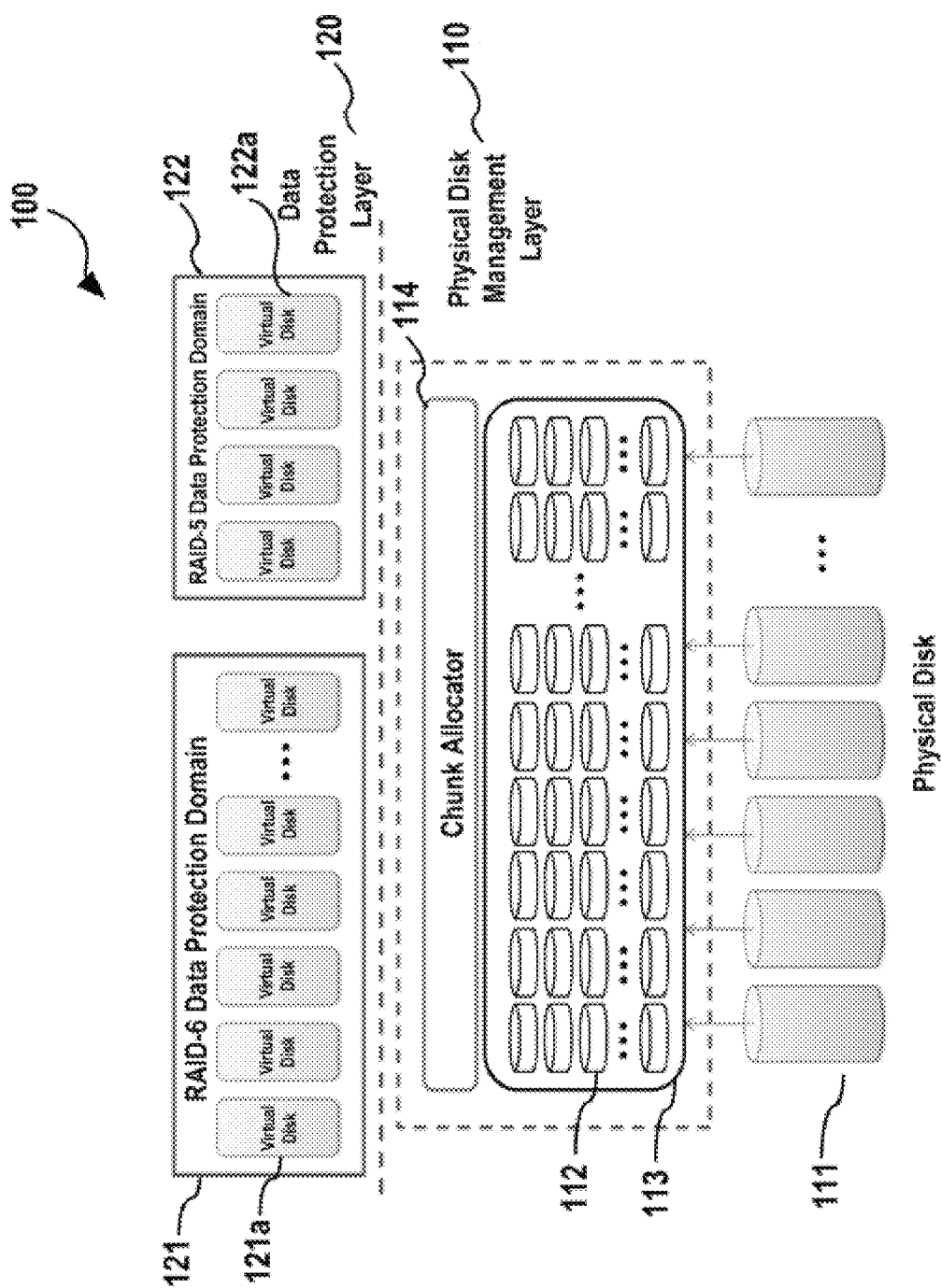
FIG. 1 shows an exemplary DDVS architecture 100 obtained according to one embodiment of the present disclosure.

With reference to the figures, detailed description is presented below to various embodiments of the present disclosure. The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

In order to solve the problem of longer data reconstruction time, a solution for applying de-clustered technology to a disk array to form a de-clustered disk array may be proposed in accordance with the embodiments of the present disclosure. In some embodiment, de-clustered disk arrays may have various implementations. In some other embodiments, for example, de-clustered technology may be used to replace one RAID controller of a small disk cluster with a set of a plurality of RAID controllers, each of which may access all physical disks through optical channel or iSCSI SAN (Internet small computer system interface storage area networking). In one embodiment, thus, a de-clustered RAID may be formed. In a further embodiment, regarding a de-clustered disk array, for example, a de-clustered RAID, when one physical disk fails, each physical disk forming the de-clustered RAID may be configured to bear a part of data recovery work. In a further embodiment, data recovery may be distributed across all RAID controllers, rather than one RAID, and several physical disks may complete all recovery work while other physical disks and RAID controllers may not take part or be involved in the recovery work. In a further embodiment, therefore, data recovery time may be significantly reduced.

In one embodiment, for a de-clustered RAID, a data protection domain may be realized in logical domain, which may implement a data protection algorithm. In a further embodiment, all physical disks may form a physical resource pool. In a further embodiment, when receiving an I/O request, for example, a write I/O request, the logical domain may randomly select a physical disk from a physical resource pool and may then allocate it to a data protection domain for a data write. In a further embodiment, however, sometimes randomly selecting a physical disk may cause too many I/O requests to be concentrated on some physical disks. In yet a further embodiment, a throughput associated with a data protection domain to which physical disks have been allocated may be reduced dramatically, and overall performance of a de-clustered RAID may be significantly affected.

In one embodiment, to at least solve the problem of longer data reconstruction time, a de-clustered RAID architecture may be proposed according to embodiments of the present disclosure. In a further embodiment, under a de-clustered RAID architecture, a virtual storage solution of physical disks may be adopted. In one embodiment, according to a virtual storage solution, a plurality of physical disks forming a disk array may be virtualized as a plurality of virtual disks. In a further embodiment, a data protection algorithm may be applied to a plurality of virtual disks to obtain redundant information on data that may be stored data. In a further embodiment, a map from the plurality of virtual disks to the plurality of physical disks may be provided. In a further embodiment, data and redundant information may be randomly stored in a plurality of physical disks based on a map. In a further embodiment, a data protection domain may be formed by the plurality of virtual disks, to which a data protection algorithm may be applied. In a further embodiment, a data protection domain may be separated from a physical disk management layer formed by the plurality of physical disks where data may be actually stored, and data and redundant information may be stored in a plurality of physical disks according to a predetermined allocation policy. In a further embodiment, by means of a virtual storage solution according to embodiments of the present disclosure, once a physical disk fails, all working disks among a plurality of physical disks may take part in data reconstruction for a failure disk. In a further embodiment, data reconstruction time may be significantly reduced. For the purpose of description, a de-clustered RAID architecture according to the embodiments of the present disclosure may be hereinafter referred to as "DataDomain Virtual Storage (DDVS) architecture".

Embodiments of the present disclosure relate to a system, a computer program product and a method for improving performance of a de-clustered disk array comprising a plurality of physical disks. In one embodiment statistics may be generated on a number and types of active input/output (I/O) requests of each of a plurality of physical disks. In a further embodiment, a plurality of physical disks may be divided at least into a first schedule group and a second schedule group based on the statistic number and types of the active I/O requests of the each physical disk for a predetermined time period. In a further embodiment a first schedule group may have a first schedule priority, and the second schedule group may have a second schedule priority. In a further embodiment a second schedule priority may be higher than a first schedule priority. A further embodiment may include, selecting, in a decreasing order of schedule priority, a physical disk that may be scheduled from any one of the resulting schedule groups.

In one exemplary embodiment, selecting, in a decreasing order of the schedule priority, a physical disk for schedule from any one of the resulting schedule groups may include randomly selecting a physical disk from any one of the resulting schedule groups for schedule.

One exemplary embodiment may include periodically updating a number and type of active I/O requests of each physical disk. A further embodiment may include, causing, based on an updated number and type of active I/O requests, at least a portion of a plurality of physical disks may move between different schedule groups of the resulting schedule groups.

A further embodiment may include collecting information on bad stripes under data reconstruction. A further embodiment may include identifying physical disks with data reconstruction I/O requests in the second schedule group that may be based on collected information on the bad stripes. A further embodiment may include dividing physical disks in the second schedule group into a first subgroup and a second subgroup may be based on identifying, physical disks in a first subgroup that may be having a data reconstruction I/O requests, physical disks in the second subgroup may not be having the data reconstruction I/O requests. A further embodiment may include assigning a third schedule priority to a second subgroup, and the third schedule priority may be higher than a second schedule priority.

In one embodiment, selecting, in a decreasing order of a schedule priority, a physical disk for schedule from any one of the resulting schedule groups may include in response to determining that a physical disk may be selected from a second schedule group, selecting, may be in a decreasing order of the schedule priority, a physical disk for schedule from any one of a first schedule subgroup and a second schedule subgroup.

One embodiment may include virtualizing a plurality of physical disks as a plurality of virtual disks. A further embodiment may include, selecting, in a decreasing order of a schedule priority, a physical disk for schedule from any one of a resulting schedule group. A further embodiment may include in response to at least one virtual disk of a plurality of virtual disks that may receive an I/O request, selecting a physical disk from any one of a resulting schedule groups that may be in a decreasing order of a schedule priority. A further embodiment may include providing a map from the at least one virtual disk to the selected physical disk. A further embodiment may include dispatching a received I/O request to a selected physical disk that may be based on a map.

In one embodiment, address space of the each physical disk may be divided into a plurality of chunks. In a further embodiment, each of a plurality of chunks may have a same storage capacity. In a further embodiment, address space of each of the plurality of virtual disks may be divided into a plurality of blocks. In a further embodiment, each of the plurality of blocks may have a same storage capacity as each of a plurality of chunks.

In one exemplary embodiment, a map may be provided from the at least one virtual disk to the selected physical disk. In a further embodiment may include providing a map from blocks of the at least one virtual disk to chunks of the selected physical disk. In a further embodiment dispatching the received I/O request to the selected physical disk based on the map may include dispatching the received I/O request to the chunks of the selected physical disk based on the map.

In one exemplary embodiment, dividing the plurality of physical disks at least into a first schedule group and a second schedule group may include comparing the statistic number of a predetermined type of active I/O requests for the predetermined time period with a predetermined threshold. In a further embodiment, in response to the number of the predetermined type of the active I/O requests of one or more of the plurality of physical disks may exceed the predetermined threshold, and may include dividing the one or more physical disks into the first schedule group. In a further embodiment, in response to the number of the predetermined type of the active I/O requests of one or more of the plurality of physical disks failing to exceed the predetermined threshold, dividing the one or more physical disks into the second schedule group.

In one embodiment, there is provided an apparatus for improving performance of a de-clustered disk array which comprises a plurality of physical disks. In a further embodiment, the apparatus may include a statistics unit that may be configured to make statistics on a number and types of active input/output (I/O) requests of each of the plurality of physical disks. In a further embodiment a group dividing unit may be included that may be configured to divide the plurality of physical disks at least into a first schedule group and a second schedule group based on the statistic number and types of the active I/O requests of the each physical disk for a predetermined time period, the first schedule group having a first schedule priority, the second schedule group having a second schedule priority higher than the first schedule priority. In a further embodiment, a scheduling unit may be included that may be configured to select, in a decreasing order of the schedule priority, a physical disk for schedule from one of the resulting schedule groups.

In a further embodiment, there is provided a computer program product for improving performance of a de-clustered disk array which comprises a plurality of physical disks. The computer program product is tangibly stored on a non-transient computer-readable medium and comprises machine executable instructions which, when executed, cause the machine to perform steps of the method as described above.

By means of the embodiments of the present disclosure, it is possible to prevent too many I/O requests from concentrating on some physical disks and thereby improve overall performance of a de-clustered RAID.

FIG. 1 shows an exemplary DDVS architecture 100 obtained according to one embodiment of the present disclosure. As shown in this exemplary figure, DDVS architecture 100 comprises a physical disk management layer 110 and a data protection layer 120.

Physical disk management layer 110 is also referred to as "physical disk management domain" 110. Physical disk management layer 110 is configured to manage a plurality of physical disks forming the disk array, wherein the physical disks are generally denoted by a numeral 111. An address space of each physical disk of the plurality of physical disks 111 is divided into a plurality of chunks, and each chunk has the same storage capacity. The resulting chunks are generally denoted by a numeral 112, which form a storage pool 113.

Data protection layer 120 is configured to provide data redundancy features. Data protection layer 120 comprises a plurality of virtual disks resulting from virtualizing of the plurality of physical disks 111. A data protection algorithm may be applied to the plurality of virtual disks to obtain redundant information on data to be stored. Thus, data protection layer 120 formed by the plurality of virtual disks is also referred to as data protection domain 120.

When there are a large number of virtual disks, the plurality of virtual disks may be divided into a plurality of groups, and the same or different data protection algorithms may be applied to each group. In FIG. 1, for the purpose of illustration, the plurality of virtual disks are divided into two groups, namely a group 121 and a group 122. Virtual disks in group 121 are generally denoted by a numeral 121a, and virtual disks in group 122 are generally denoted by a numeral 122a. Different data protection algorithms are applied to groups 121 and 122. For example, RAID-6 algorithm may be applied to group 121, and RAID-5 algorithm may be applied to group 122. Thereby, group 121 to which RAID-6 algorithm is applied is also referred to as RAID-6 data protection domain, and group 122 to which RAID-5 algorithm is applied is also referred to as RAID-5 data protection domain. The RAID-6 data protection domain and the RAID-5 data protection domain are collectively referred to as data protection domain 120.

The address space of each virtual disk of the plurality of virtual disks 121a and 122a is divided into a plurality of blocks (not shown in the Figure). Each block of the plurality of blocks may have the same storage capacity as each chunk 112. It should be understood that the embodiments of the present disclosure are not limited to this, but each block may also have a different storage capacity from each chunk 112.

Physical disk management layer 110 further comprises a chunk allocator 114 for mapping a block in data protection layer 120 to a corresponding chunk 112 in physical disk management layer 110. During data write process, chunk allocator 114 allocates corresponding chunks to virtual disks 121a according to the data amount that the user desires to write into blocks of virtual disks 121a under a predetermined allocation policy, so as to write data into corresponding chunks 112. Chunk allocator 114 may, for example, use a pseudo-random algorithm to randomly allocate chunks for virtual disks (blocks). With this algorithm, data may be randomly distributed across all physical disks.

It should be understood that in one embodiment, merely for illustration purposes, the plurality of virtual disks may be divided into two groups as shown in FIG. 1. In a further embodiment different data protection algorithms may be applied to the two groups. However, the embodiments of the present disclosure are not limited to this. In an exemplary embodiment, the plurality of virtual disks may not be divided into groups. In an additional embodiment, the same data protection algorithm may be applied to two groups as shown in FIG. 1, such as RAID-5, RAID-6, or erasure code-related data protection algorithm.

In one embodiment, the DDVS architecture may be used in a data backup system. In a further embodiment, DataDomain product DDR may be a data backup system using the above DDVS architecture. In a further embodiment, DDR may have a regular I/O pattern and most of requests may be sequential write or read requests. In a further embodiment, in order to improve throughput for the backup system, the core component DDFS of the DDR (DDR's File System) may use log structure file system design. In yet a further embodiment, because DDFS may never do an overwrite operation, all data written into storage may be sequential.

Figure 2:
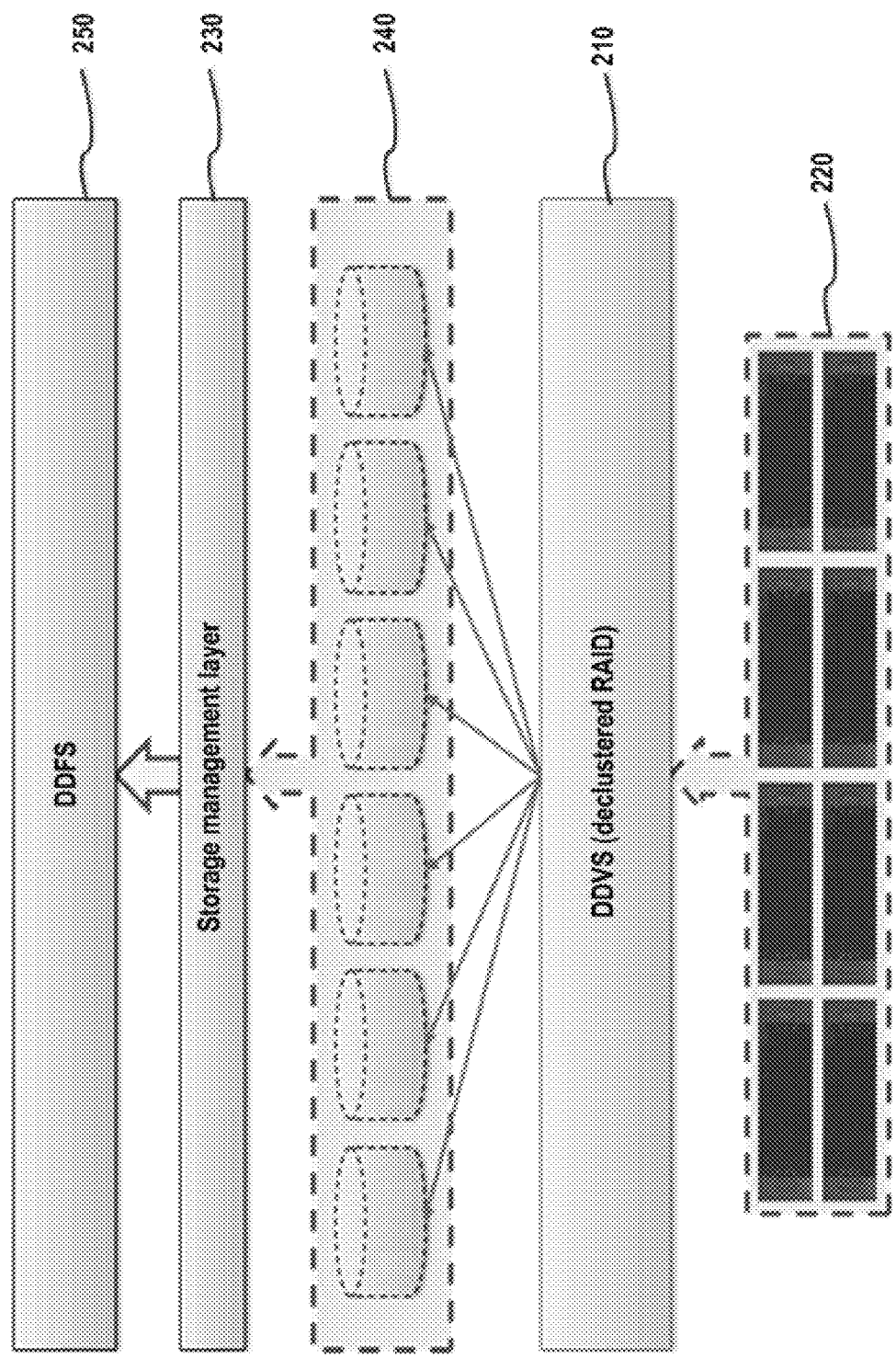
FIG. 2 shows an exemplary storage configuration of a DDVS backup system in accordance with an embodiment of the present disclosure.

FIG. 2 shows the storage configuration for an exemplary DDR backup system. As can be seen from FIG. 2, a plurality of shelves denoted by a numeral 220 can be added into DDVS 210, and a plurality of data protection domains denoted by a numeral 240 are exported to a storage management layer 230. In order to improve throughput for DDFS 250, storage management layer 230 will distribute I/Os into a plurality of data protection domains 240 in parallel, and then DDVS 250 dispatches data into physical disks on shelves 220 at random by a chunk allocator (not shown in the Figure).

For backup application, most I/Os are sequential, and DDFS 250 can be designed into log structured mode to avoid overwrite so as to optimize write performance. In order to fully use bandwidth of physical disks, storage management layer 230 distributes all I/Os into under-layers in parallel.

In one embodiment, for the de-clustered RAID, the generic algorithm to be realized in the chunk allocator may be a pseudo-random algorithm which may be widely used in the storage area. In a further embodiment, an advantage of pseudo-random algorithm may be easy to realize. In some other embodiment, such as in some application environments, it may seriously affect performance of de-clustered RAID. Description is presented below by means of an exemplary application scenario as shown in FIG. 3.

Figure 3:
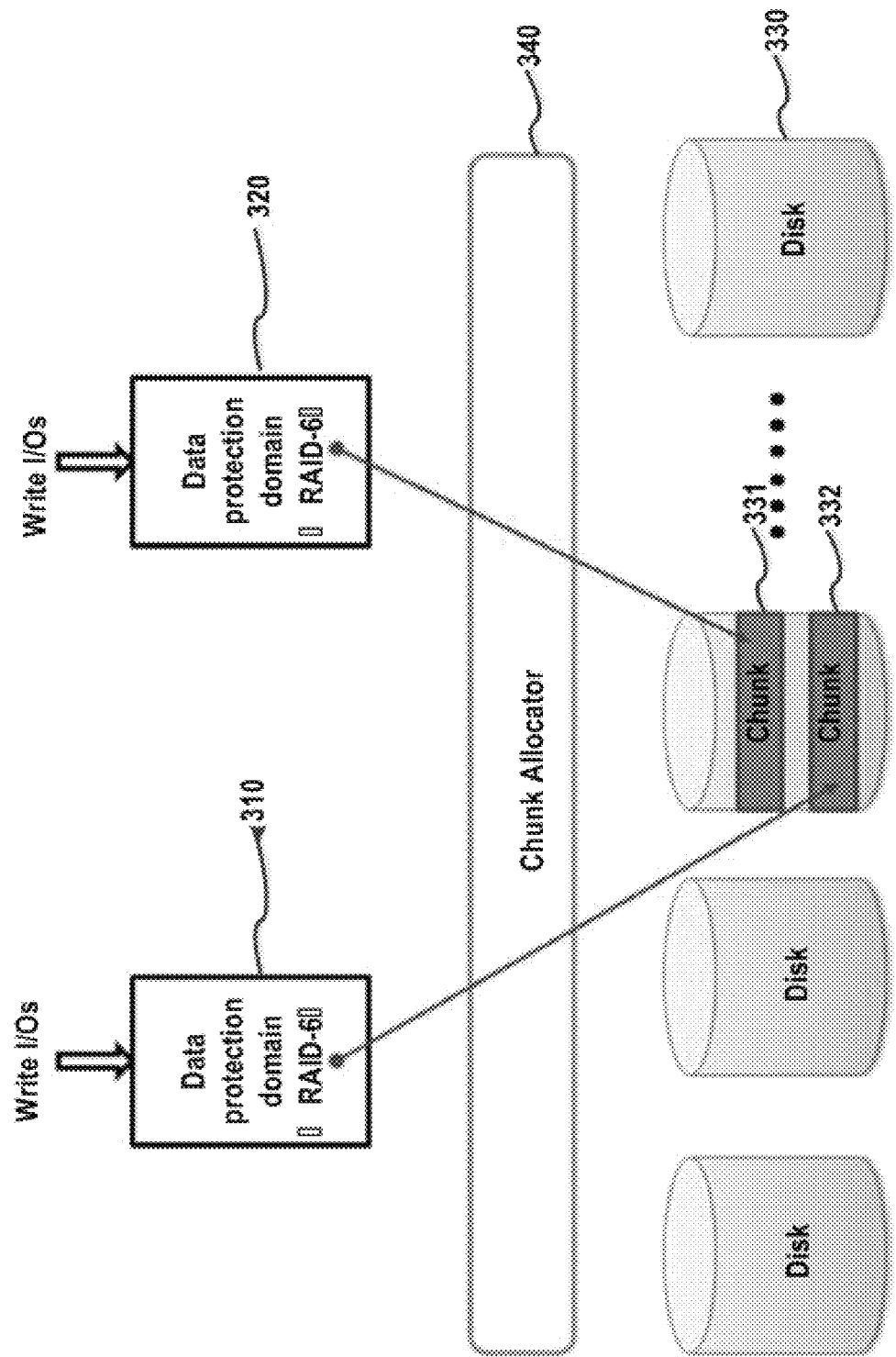
FIG. 3 shows an exemplary application scenario using a pseudo-random algorithm in DDVS in accordance with an embodiment of the present disclosure.

FIG. 3 shows an exemplary application scenario using pseudo-random algorithm in DDVS. As shown in FIG. 3, a data protection algorithm, for example RAID-6 data protection algorithm, is implemented in a logical domain, whereby a plurality of data protection domains are formed, for example RAID-6 data protection domains 310 and 320. Each data protection domain comprises a plurality of virtual disks resulting from virtualizing of physical disks. Each virtual disk is divided into a plurality of blocks. Each of the plurality of physical disks denoted by a numeral 330 is divided into a plurality of chunks, such as chunks 331 and 332. These chunks are managed as one storage pool in physical domain. A chunk allocator 340 is just like a bridge to connect logical domain and physical domain. If chunk allocator 340 uses a pseudo-random algorithm, blocks from data protection domains 310 and 320 can be mapped into chunks 331 and 332 in the same physical disk. Thereby, throughput of both data protection domains 310 and 320 are affected with each other dramatically.

Figure 4:
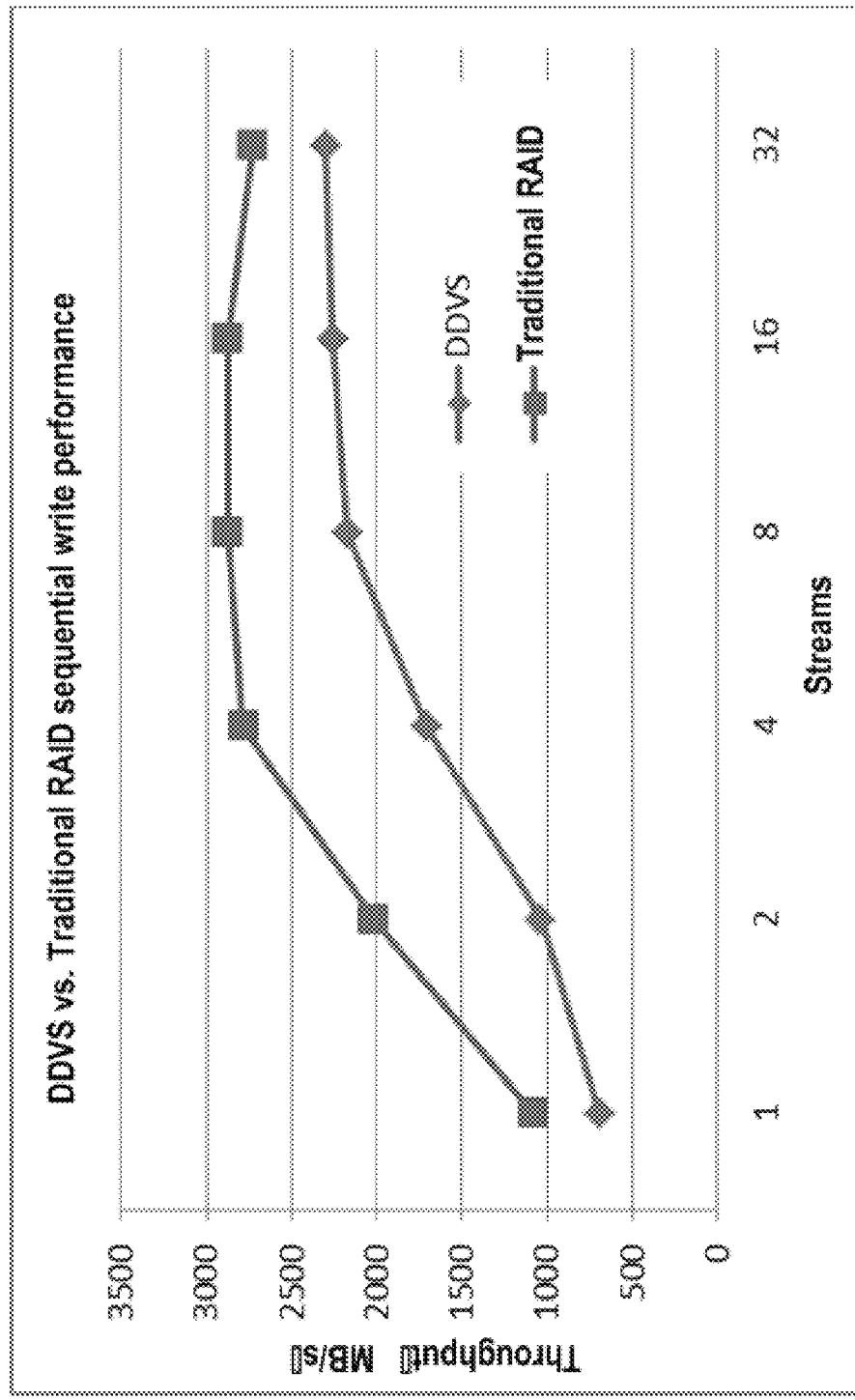
FIG. 4 shows an exemplary comparison between DDVS with the pseudo-random algorithm and traditional RAID in accordance with an embodiment of the present disclosure.

A test has been conducted by using a pseudo-random algorithm in chunk allocator 340, and the exemplary test result is shown in FIG. 4. In such configuration using three data protection domains in the logical domain, DDVS with the pseudo-random algorithm has lower sequential write performance as compared with traditional RAID (also referred to as clustered RAID). As can be seen from the exemplary test result in FIG. 4, the performance bottleneck of traditional RAID lies in HBA bandwidth, but the performance bottleneck of DDVS lies in disk bandwidth. If HBA bandwidth is increased, the gap between DDVS and traditional RAID will be bigger.

In one embodiment, the pseudo-random algorithm may not be suitable for some application areas, for example, backup application. In a further embodiment, in order to solve a problem of pseudo-random algorithm applied in some application areas, embodiments of the present disclosure propose a new physical disk scheduling algorithm to improve performance of a de-clustered RAID. In a further embodiment, physical disk resources may not be scheduled randomly but may need to aware I/Os according to an idea of this algorithm. In a further embodiment, for the purpose of description, the proposed algorithm may be hereinafter referred to as I/O awareness random (IAR) algorithm.

Figure 5:
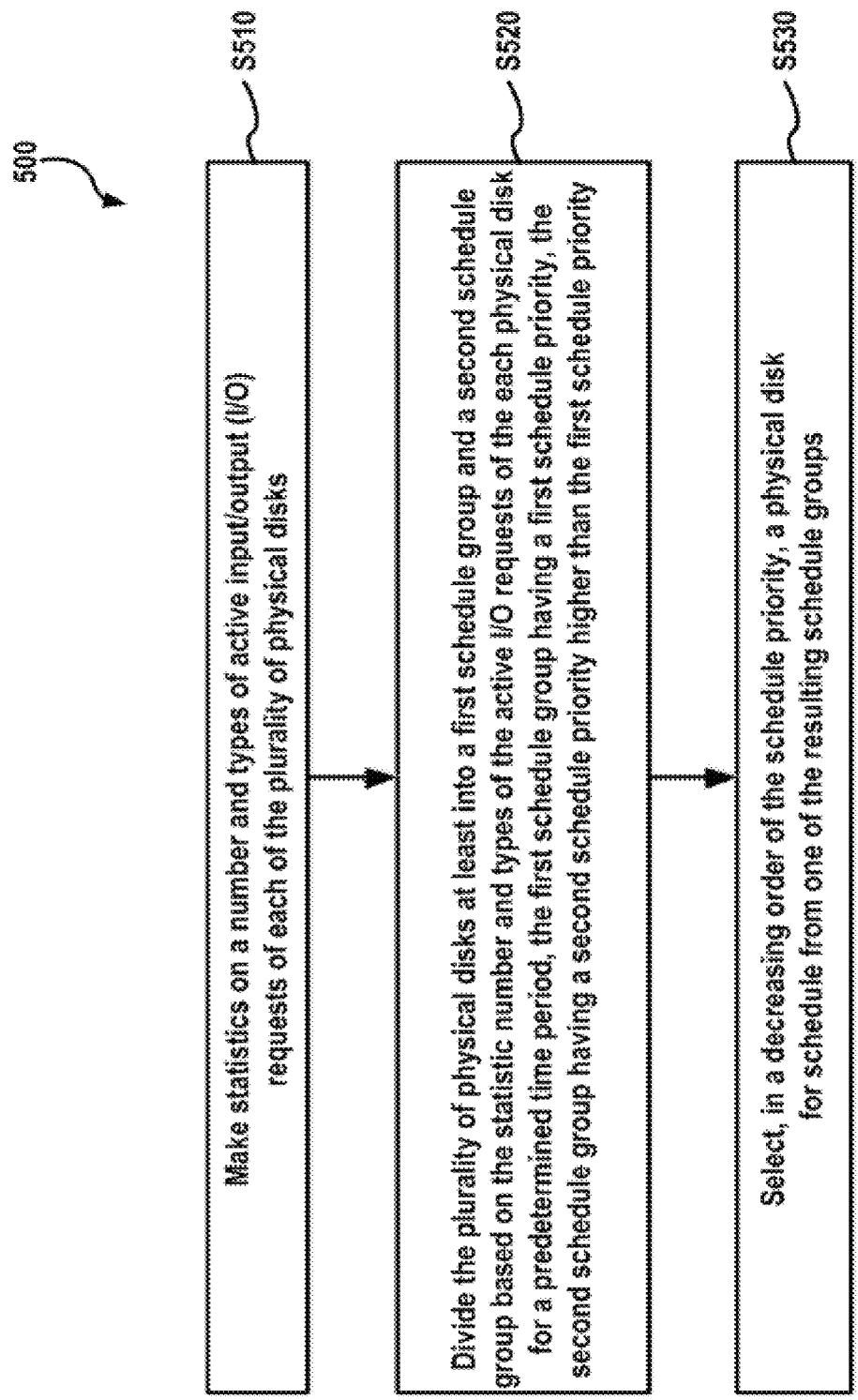
FIG. 5 shows an exemplary flowchart of a method 500 for improving performance of a de-clustered disk array according to one embodiment of the present invention in accordance with an embodiment of the present disclosure.

FIG. 5 shows an exemplary flowchart of a method 500 for improving performance of a de-clustered disk array according to one embodiment of the present disclosure. Method 500 may be implemented in any de-clustered disk array, whether the de-clustered disk array is currently known or to be developed later. In one specific embodiment, method 500 may be implemented in a DDVS de-clustered disk array as shown in FIG. 1. Specifically, method 500 may be implemented in chunk allocator 114 of the DDVS de-clustered disk array as shown in FIG. 1.

In step S510, statistics is made on a number and types of active input/output (I/O) requests of each physical disk of the plurality of physical disks. In step S520, the plurality of physical disks are at least divided into a first schedule group and a second schedule group based on the statistic number and types of active I/O requests of the each physical disk for a predetermined time period. In step S530, a physical disk is selected for schedule from one of the resulting schedule groups in a decreasing order of the schedule priority.

In one embodiment, as used herein, an active I/O request may refer to an I/O request that may have been run for a predetermined time period. In a further embodiment, a predetermined time period may be, for example, 1 second or longer. In a further embodiment, types of I/O requests may include, but may not be limited to: file system write I/O, file system read I/O, data reconstruction write I/O, data reconstruction read I/O, etc. In a further embodiment, it may be understood that the fact that the number of active I/O requests of some physical disk(s) equals zero indicates that these physical disks have no I/O request and thus are in idle state.

In one embodiment, a first schedule group has a first schedule priority, and a second schedule group has a second schedule priority higher than the first schedule priority.

In one specific embodiment, a plurality of physical disks may be divided into a first schedule group and a second schedule group based on a statistic number and types of active I/O requests of each physical disk for a predetermined time period. In a further exemplary embodiment, a statistic number of active file system write I/O requests of each physical disk for the predetermined time period may be compared with a predetermined threshold. In a further embodiment, in response to a number of active file system write I/O requests of one or more physical disks of a plurality of physical disks exceeding a predetermined threshold, a respective physical disk may be divided into a first schedule group. In a further embodiment, in response to a number of active file system write I/O requests of one or more physical disks of a plurality of physical disks failing to exceed a predetermined threshold, a respective physical disk may be divided into a second schedule group.

In one embodiment, by dividing physical disks into schedule groups based on a number and types of active I/O requests and selecting, in a decreasing order of a schedule priority, a physical disk for schedule from one of a resulting schedule groups, I/O requests may be avoided to be concentrated on some physical disks.

In one embodiment, selecting, in a decreasing order of the schedule priority, a physical disk for schedule from one of the resulting schedule groups may include randomly selecting a physical disk from one of the resulting schedule groups for schedule. In a further embodiment, data may be caused to be randomly distributed in physical disks, and further data reconstruction time may be significantly reduced for the de-clustered disk array.

In one embodiment, method 500 may further include periodically updating a number and types of active I/O requests of each physical disk; and may cause at least a portion of a plurality of physical disks to move between different schedule groups based on an updated number and types of active I/O requests. In a further embodiment, a cycle that a number and types of active I/O requests of each physical disk may be updated, may be set according to a specific application scenario.

In one embodiment, it may be understood that a cycle that a number and types of active I/O requests of each physical disk may be updated, may be the same as or different than a cycle that a plurality of physical disks may be divided into schedule groups based on the updated number and types. In an exemplary embodiment, where two cycles may be set to be the same as each other, a plurality of physical disks may be divided into schedule groups immediately after updating, so that a physical disk having file system write I/O requests may be always in a schedule group with a lower schedule priority. In a further embodiment, a cycle that a plurality of physical disks may be divided into schedule groups and may also be longer than a cycle for updating.

Figure 6:
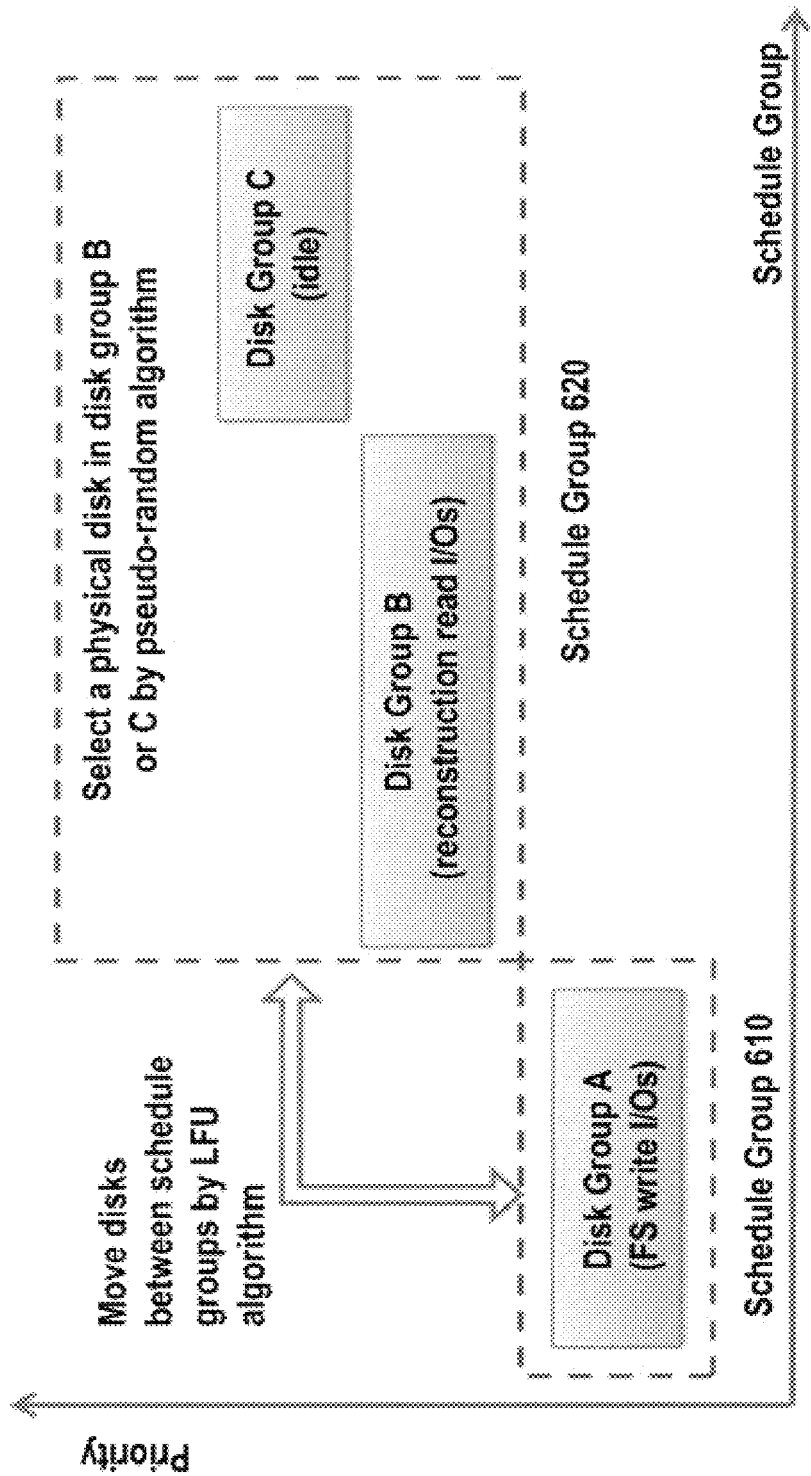
FIG. 6 shows one specific embodiment of the method for improving performance of a de-clustered disk array of the present disclosure.

FIG. 6 shows one specific embodiment of a method for improving performance of a de-clustered disk array according to the present disclosure.

In one embodiment, when chunk allocator 114 shown in FIG. 1 allocates chunks for blocks in a virtual disk 521a, some physical disks of the physical disks 111 may have heavy file system I/Os, some physical disks may have data reconstruction I/Os and others may be in an idle state. In a further embodiment, for a backup application, a design goal may be that file system I/Os may be distributed into different physical disks without overlap in the same physical disk. In a further embodiment, it may be better to separate data reconstruction I/O from file system I/O so that the system performance with data reconstruction I/Os may be consistent with the system performance without data reconstruction I/Os.

Reference is made to FIG. 6, wherein in order to separate physical disks by I/O loads (e.g., a number and types of active I/O requests), a least frequently used (LFU) algorithm is used to divide physical disks into two schedule groups, e.g., schedule groups 610 and 620. Schedule group 610 has a "disk group A". All physical disks in "disk group A" have heavy file system (FS) write I/Os. Schedule group 620 has a "disk group B" and a "disk group C". All physical disks in "disk group B" have data reconstruction read I/Os, while all physical disks in "disk group C" are in an idle state without any I/Os. In order to prevent file system write I/Os from concentrating in "disk group A", a low schedule priority for allocating new chunks is assigned to schedule group 610, while a high schedule priority for allocating new chunks is assigned to schedule group 620. In other words, chunk allocator first selects a physical disk from schedule group 620 comprising "disk group B" and "disk group C" and allocates its chunks to blocks.

Further, since "disk group C" in schedule group 620 is in idle state, it is desired to separate "disk group B" with "disk group C" and assign to "disk group C" the highest priority to be used by chunk allocator. In order to separate "disk group B" with "disk group C", first, information on bad stripes under reconstruction is collected. Next, physical disks having data reconstruction I/O requests in schedule group 620 are identified based on the collected information on bad stripes. Then, physical disks in schedule group 620 are divided into "disk group B" and "disk group C" based on the identifying, wherein all physical disks in "disk group B" have data reconstruction I/O requests, while all physical disks in "disk group C" are in idle state without any data reconstruction I/O request. Subsequently, a higher schedule priority is assigned to "disk group C" than that is assigned to "disk group B". Therefore, chunk allocator first selects a physical disk from "disk group C" for allocation.

In one embodiment, when it may be determined to select a physical disk from "disk group A", "disk group B" or "disk group C", a pseudo-random algorithm may be used for selection. In a further embodiment, the purpose of using pseudo-random may be to randomly distribute data in the data protection domain into all physical disks in the selected disk group, whereby data reconstruction time may be reduced dramatically in the de-clustered RAID.

In one embodiment, it may be seen that from an overall perspective, the LFU algorithm may be used to prevent too many I/Os from concentrating on some physical disks. In a further embodiment, from a local perspective, pseudo-random algorithm may be applied to select a physical disk for allocation. In a further embodiment, with an IAR algorithm, not only a sequential performance problem as mentioned above may be avoided, but also data may be distributed into all physical disks in random to improve data reconstruction performance for the de-clustered RAID.

Figure 7:
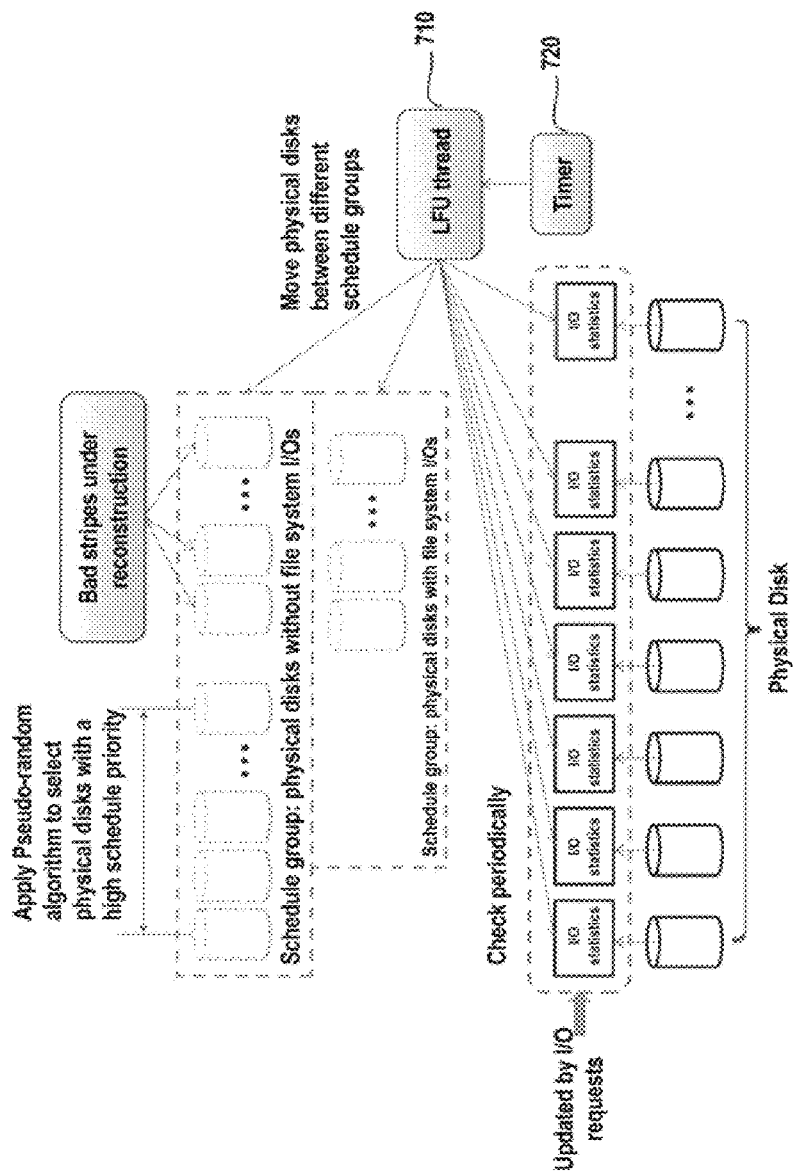
FIG. 7 shows one specific implementation of an IAR algorithm in a chunk allocator as shown in FIG. 1 according to the present disclosure.

FIG. 7 shows one specific implementation of an IAR algorithm in chunk allocator 114 as shown in FIG. 1 according to the present disclosure.

As shown in FIG. 7, the implementation of IAR algorithm may be divided into three parts:

1) I/O statistic information updater configured to update I/O statistic information in I/O path to record I/O loads for all physical disks.

2) I/O count checker and disk classifier configured to check I/O loads for physical disks and classify physical disks into different schedule groups.

3) Disk selector configured to use the pseudo-random algorithm to select an available physical disk from a disk group in the determined schedule group.

In one embodiment, each physical disk may have I/O statistic information, which may be updated in the period of submitting I/O requests to physical disks. In a further embodiment, a major information in I/O statistic information may be the number and types of active I/O requests for each physical disk.

Referring back to FIG. 7, the core component of this algorithm is a LFU kernel thread 710, which is run periodically by a scheduling timer 720. In one embodiment, in this implementation, the LFU thread may be scheduled every second, and the major task may be to check I/O statistic information. In a further embodiment, in a backup application scenario, if the number of active I/O requests for a physical disk may be lower than a predetermined threshold, the physical disk may be moved to a schedule group without file system I/Os. In a further embodiment, the physical disk may be moved to a schedule group with file system I/Os. In a further embodiment, LFU thread may be scheduled every second, whereby the algorithm may make sure that physical disks with file system I/Os may always be in a low-priority schedule group.

In one embodiment, in this specific implementation, physical disks with data reconstruction I/Os may be identified by the information on bad stripes under reconstruction. In a further embodiment, if an implementation does not care about data reconstruction I/Os, this step may be skipped.

In a further embodiment, when chunk allocator may require to allocate chunks from physical disks, the work flow may be described as below.

1) Check if "disk group C" may have available physical disk resources. If a free physical disk exists (its chunks are not mapped to blocks), the physical disk may be obtained by using the pseudo-random algorithm and the work flow exits.

2) If a physical disk cannot be obtained from "disk group C", it may be attempted to select a physical disk from "disk group B". Like step 1), the pseudo-random algorithm may be used to select a physical disk to allocate a chunk. A physical disk may be selected successfully, and this process may be then terminated.

3) If a physical disk cannot be obtained from "disk group B", it may be attempted to select a physical disk from "disk group A". In this step, it means all physical disks may be under file system writing. Thus, a physical disk may be selected by using the pseudo-random algorithm.

Figure 8:
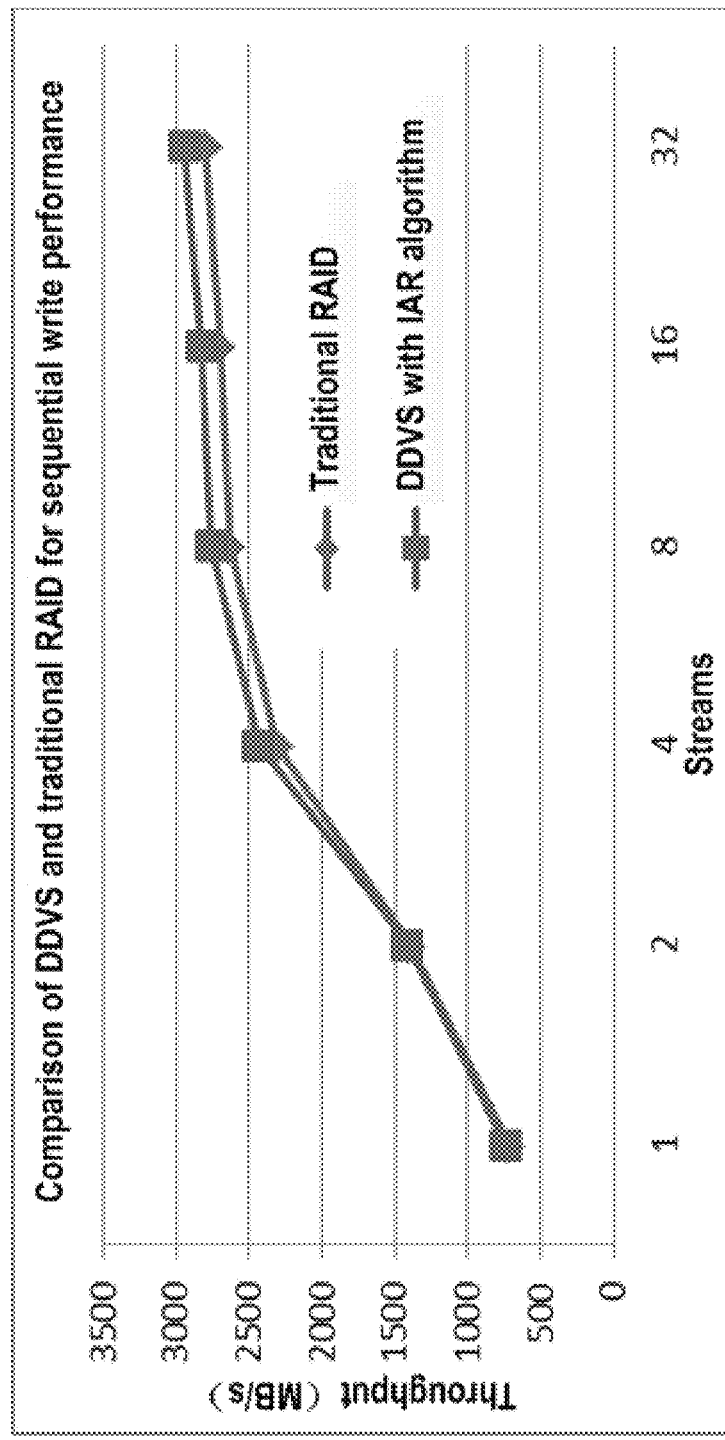
FIGS. 8 to 10 show an exemplary evaluation results of the IAR algorithm in accordance with an embodiment of the present disclosure.
Figure 9:
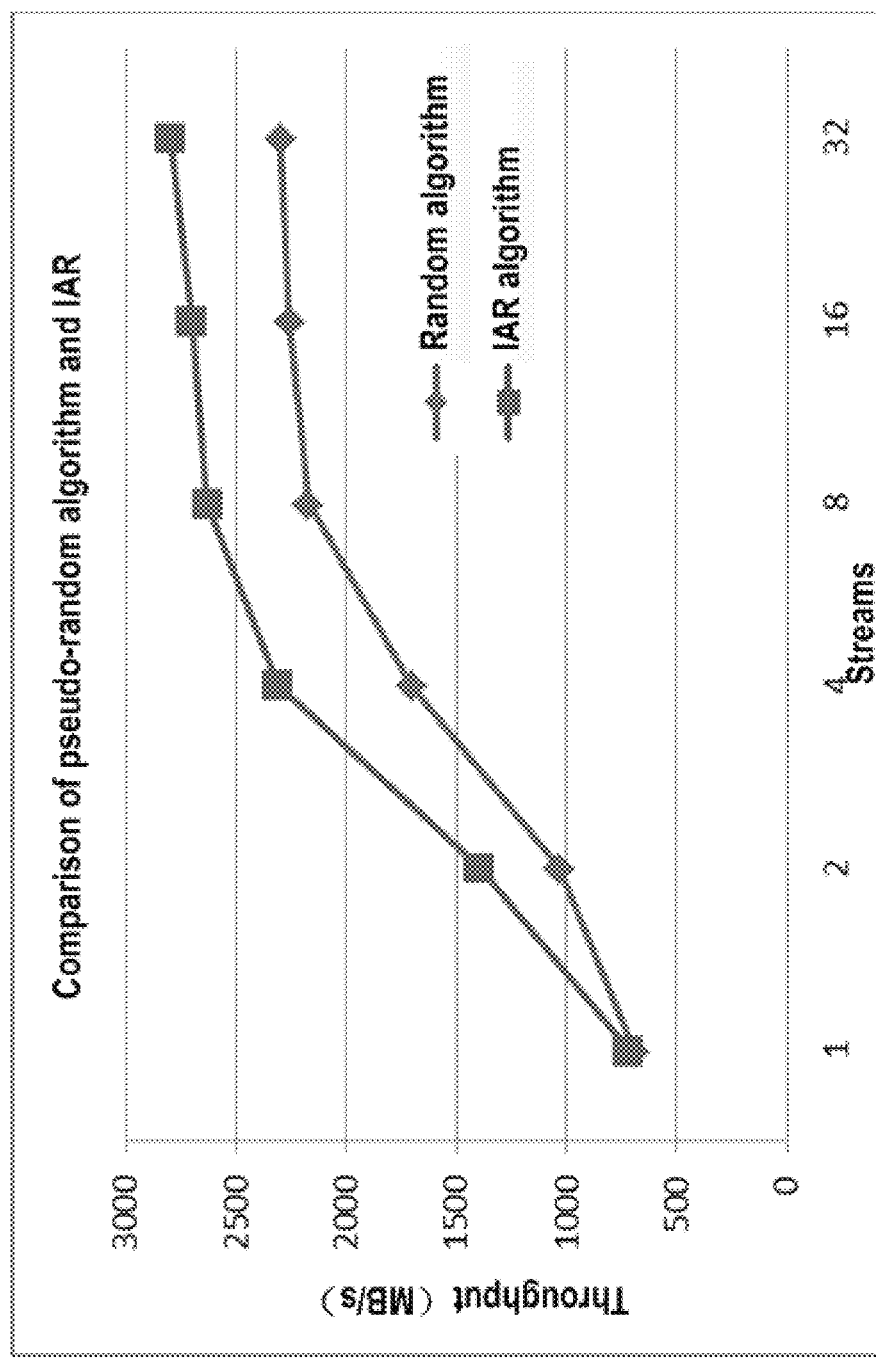
Figure 10:
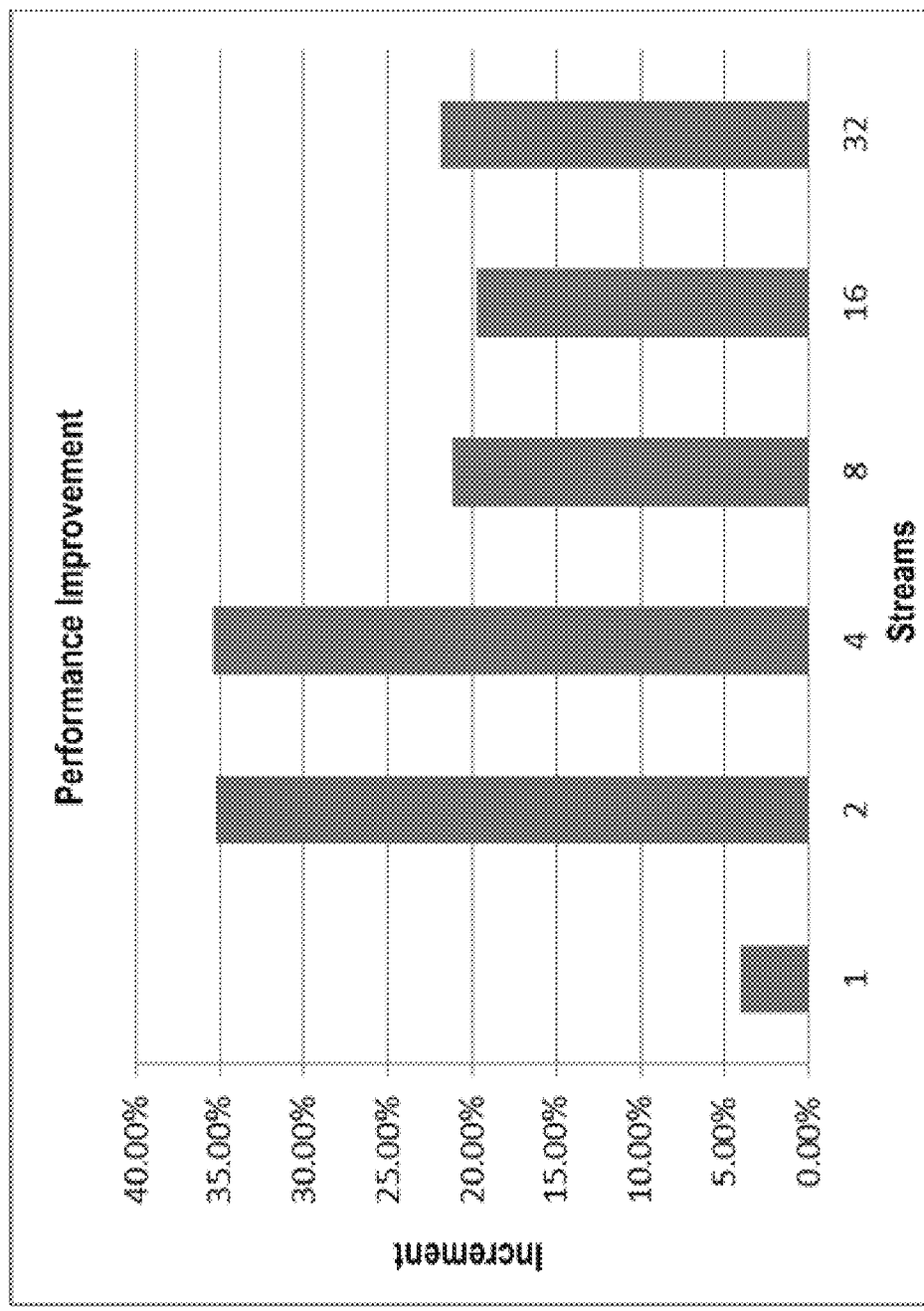

FIGS. 8 to 10 show exemplary evaluation results for IAR. In order to verify this new algorithm, a test is made on the DataDomain system to compare IAR and the pseudo-random algorithm. Experiments show that IAR has achieved the expected goal and makes sequential write performance faster than the pseudo-random algorithm.

FIG. 8 shows an exemplary comparison in sequential write performance between DDVS and traditional RAID. For the traditional RAID, data layout is regular, and thus in parallel write mode, two data protection domains will not have any performance interference causing a performance drop. Here, a test has been conducted on sequential write performance for DDVS with IAR based on two data protection domains and on the traditional RAID. As can be seen from the result in FIG. 8, DDVS with IAR almost has the same performance as the traditional RAID. Additionally, the bottleneck is HBA bandwidth limitation.

FIG. 9 shows an exemplary comparison in sequential write performance between DDVS with the pseudo-random algorithm and DDVS with the IAR algorithm. As can be seen from FIG. 9, the sequential write performance of DDVS using the IAR algorithm is better than that using the pseudo-random algorithm.

FIG. 10 shows an exemplary performance improvement of IAR. As can be seen from FIG. 10, the performance improvement of the IAR algorithm is over 20% when the number of test streams is greater than 1.

In one embodiment, in a de-clustered RAID, an algorithm used by the chunk allocator may affect the application performance. In a further embodiment, practice show the IAR algorithm at least may improve a sequential write performance without any other overhead. In a further embodiment, IAR may be quite suitable for a de-clustered RAID at least may be suitable in the backup area.

It should be understood that although the embodiments of the present disclosure have been described in the context where the method may be applied in data backup areas to improve sequential write performance, the method may further be applied in other areas to improve other performance of a de-clustered disk array. In an additional embodiment, although the implementation of the method is illustrated for a specific de-clustered RAID as DDVS, the implementation may not limited to this, and may be implemented in any de-clustered disk array.

Figure 11:
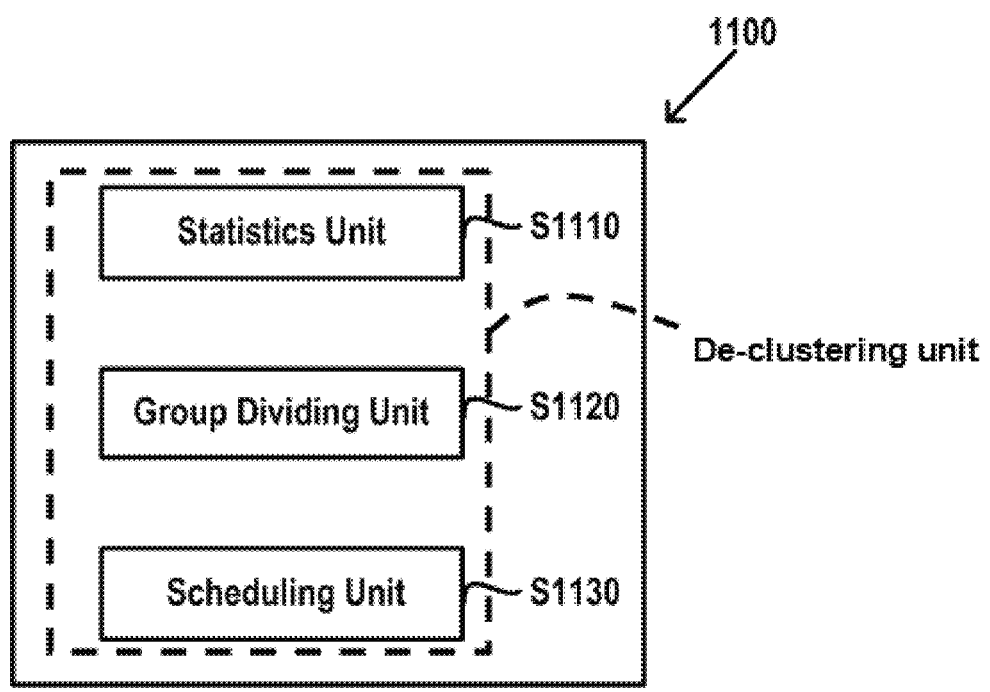
FIG. 11 shows an exemplary block diagram of an apparatus 1100 for improving performance of a de-clustered disk array according to one embodiment of the present disclosure.

The embodiments of the present disclosure further provide an apparatus for improving performance of a de-clustered disk array, the de-clustered disk array comprising a plurality of physical disks. FIG. 11 shows a block diagram of an exemplary apparatus 1100 for improving performance of a de-clustered disk array according to one embodiment of the present disclosure.

Apparatus 1100 comprises: a statistics unit 1110 configured to make statistics on a number and types of active input/output (I/O) requests of each of the plurality of physical disks; a group dividing unit 1120 configured to divide the plurality of physical disks at least into a first schedule group and a second schedule group based on the statistic number and types of the active I/O requests of the each physical disk for a predetermined time period, the first schedule group having a first schedule priority, the second schedule group having a second schedule priority higher than the first schedule priority; and a scheduling unit 1130 configured to select, in a decreasing order of the schedule priority, a physical disk for schedule from one of the resulting schedule groups.

In one exemplary embodiment, scheduling unit 1130 may be further configured to randomly select a physical disk from one of the resulting schedule groups for schedule.

In one exemplary embodiment, apparatus 1100 may further comprises an update unit configured to periodically update a number and types of the active I/O requests of each physical disk; and a moving unit configured to cause, based on an updated number and types of active I/O requests, at least a portion of a plurality of physical disks to move between different schedule groups of a resulting schedule groups.

In one exemplary embodiment, apparatus 1100 further comprises: a collecting unit configured to collect information on bad stripes under data reconstruction; an identifying unit configured to identify physical disks with data reconstruction I/O requests in a second schedule group based on collected information on the bad stripes; a subgroup dividing unit configured to divide physical disks in a second schedule group into a first subgroup and a second subgroup based on the identifying, physical disks in a first subgroup having data reconstruction I/O requests, physical disks in a second subgroup not having the data reconstruction I/O requests; and a priority assigning unit configured to assign a third schedule priority to a second subgroup, the third schedule priority being higher than a second schedule priority.

In one exemplary embodiment, scheduling unit 1130 is further configured to in response to determining that a physical disk is selected from a second schedule group, select, in a decreasing order of schedule priority, a physical disk for schedule from one of a first schedule subgroup and a second schedule subgroup.

In one exemplary embodiment, apparatus 1100 further comprises: a chunk dividing unit configured to divide address space of each physical disk into a plurality of chunks, each of a plurality of chunks having a same storage capacity; and a block dividing unit configured to divide address space of each of a plurality of virtual disks into a plurality of blocks, each of a plurality of blocks having a same storage capacity as each of a plurality of chunks.

In one exemplary embodiment, scheduling unit 1130 is further configured to provide a map from blocks of at least one virtual disk to chunks of a selected physical disk; and to dispatch a received I/O request to chunks of a selected physical disk based on the map.

In one exemplary embodiment, group dividing unit 1120 is further configured to compare the statistic number of a predetermined type of active I/O requests for a predetermined time period with a predetermined threshold; in response to a number of the predetermined type of the active I/O requests of one or more of a plurality of physical disks exceeding a predetermined threshold, to divide one or more physical disks into a first schedule group; and in response to a number of the predetermined type of active I/O requests of one or more of a plurality of physical disks failing to exceed a predetermined threshold, to divide the one or more physical disks into a second schedule group.

In one exemplary embodiment, statistic unit 1110, group dividing unit 1120 and scheduling unit 1130 along with all sub-unit disclosed above may be combined into a single de-clustering unit (not shown in Figure, dotted line encompassing the units), wherein a single de-clustering unit may advantageously perform tasks associated with each of the units and sub-units to achieve the desired result.

Figure 12:
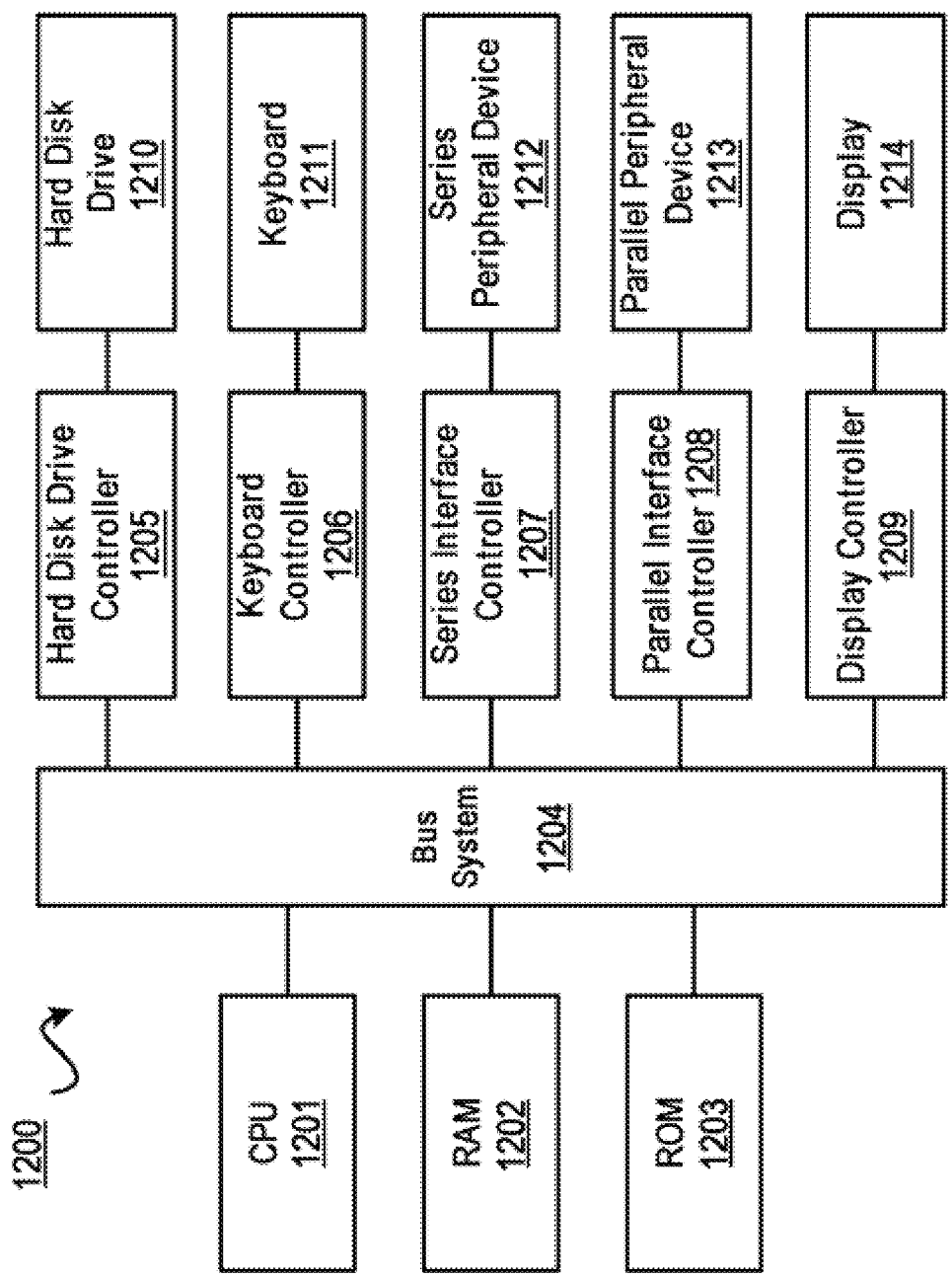
FIG. 12 shows an exemplary schematic block diagram of a computer system 1200 which is applicable of implementing the embodiments of the present disclosure.
Figure 13:
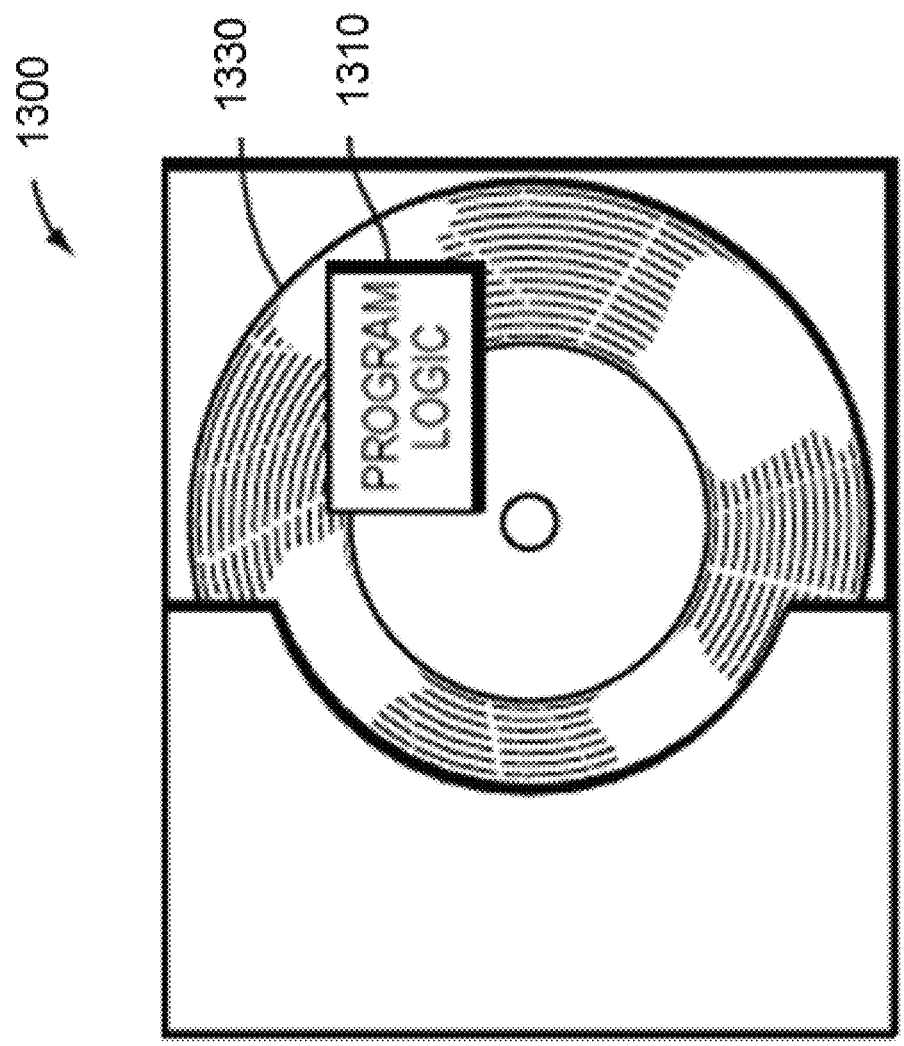
FIG. 13 shows an example of an embodiment of a method embodied on a computer readable storage medium that may utilize the techniques described herein, in accordance with an embodiment of the present disclosure.

With reference to FIG. 12 below, this figure shows a schematic block diagram of a computer system 1200 which is applicable of implementing the embodiments of the present disclosure. For example, computer system 1200 shown in FIG. 12 may be used for implementing above-described apparatus 1800 for accelerating data reconstruction for a disk array.

As shown in FIG. 12, computer system 1200 includes: CPU (Central Processing Unit) 1201, RAM (Random Access Memory) 1202, ROM (Read Only Memory) 1203, system bus 1204, hard disk drive controller 1205, keyboard controller 1206, serial interface controller 1207, parallel interface controller 1208, display controller 1209, hard disk drive 1210, keyboard 1211, serial peripheral device 1212, parallel peripheral device 1213 and display 1214. Among these devices, connected to system bus 1204 are CPU 1201, RAM 1202, ROM 1203, hard disk drive controller 1205, keyboard controller 1206, serial interface controller 1207, parallel interface controller 1208 and display controller 1209. Hard disk drive 1210 is coupled to hard disk drive controller 1205; keyboard 1211 is coupled to keyboard controller 1206; serial peripheral device 1212 is coupled to serial interface controller 1207; parallel peripheral device 1213 is coupled to parallel interface controller 1208; and the display 1214 is coupled to display controller 1209. It should be understood that the structural block diagram in FIG. 12 is shown only for illustration purpose, and is not intended to limit the scope of the present invention. In some cases, some devices may be added or reduced as required.

As above mentioned, apparatus 1100 may be implemented through pure hardware, for example, chip, ASIC, SOC, etc. Such hardware may be integrated into computer system 1200. Besides, the embodiments of the present disclosure may also be implemented in a form of a computer program product. For example, method 400 as described with reference to FIG. 4 may be implemented via a computer program product. This computer program product may be stored in RAM 1202, ROM 1203, hard disk drive 1210 and/or any suitable storage medium as illustrated in FIG. 12, or downloaded to computer system 1200 from a suitable location in a network. The computer program product may comprise computer code portions comprising program instructions that may be executed through a suitable processing device (for example, CPU 1201 as shown in FIG. 12). The program instruction at least may comprise instructions for implementing the steps of methods 300 and 400.

It should be noted that, embodiments of the present disclosure can be implemented in software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present disclosure may be implemented by hardware circuitry of a very large scale integrated circuit or gate array, a semiconductor such as logical chip or transistor, or a programmable hardware device such as a field-programmable gate array or a programmable logical device, or implemented by software executed by various kinds of processors, or implemented by combination of the above hardware circuitry and software such as firmware.

The communication network as mentioned in this specification may comprise various kinds of networks, including but not limited to local area network (LAN), wide area network (WAN), an IP-protocol based network (for example Internet), and a peer-to-peer network (for example ad hoc peer network).

It should be noted that although a plurality of units or subunits of the apparatuses have been mentioned in the above detailed depiction, such partitioning is merely non-compulsory (and may be replaced by a single de-clustering unit). In actuality, according to the embodiments of the present disclosure, the features and functions of two or more units above described may be embodied in one unit. On the contrary, the features and functions of one unit above described may be further partitioned to be embodied in more units.

Besides, although operations of the present methods are described in a particular order in the drawings, it does not require or imply that these operations must be performed according to this particular order, or a desired outcome can only be achieved by performing all shown operations. On the contrary, the execution order for the steps as depicted in the flowcharts may be varied. Additionally or alternatively, some steps may be omitted, a plurality of steps may be merged into one step for execution, and/or a step may be divided into a plurality of steps for execution.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. A method for improving performance of a de-clustered disk array, the de-clustered disk array comprising a plurality of physical disks, the method comprising:
   generating statistics on a number and types of active input/output (I/O) requests of each of the plurality of physical disks;
   dividing the plurality of physical disks at least into a first schedule group and a second schedule group based on the generated statistics on the number and the types of the active I/O requests of each of the physical disk for a predetermined time period, the first schedule group having a first schedule priority, the second schedule group having a second schedule priority, wherein the second schedule priority is higher than the first schedule priority;
   selecting, in a decreasing order of the schedule priority, a first physical disk to schedule from one of the resulting schedule groups;
   collecting information on bad stripes under data reconstruction;
   identifying physical disks with data reconstruction I/O requests in the second schedule group based on the collected information on the bad stripes;
   dividing the physical disks in the second schedule group into a first subgroup and a second subgroup based on the identifying, wherein physical disks in the first subgroup having the data reconstruction I/O requests, and physical disks in the second subgroup not having the data reconstruction I/O requests; and
   assigning a third schedule priority to the second subgroup, the third schedule priority being higher than the second schedule priority.

2. The method according to claim 1, wherein selecting comprises:
   randomly selecting the first physical disk from one of the resulting schedule groups for schedule.

3. The method according to claim 2, further comprising:
   periodically updating the number and types of the active I/O requests of each of the physical disk; and
   causing, based on the updated number and types of the active I/O requests, at least a portion of the plurality of physical disks to move between different schedule groups of the resulting schedule groups.

4. The method according to claim 1, further comprises:
   in response to determining that the first physical disk is selected from the second schedule group, selecting, in a decreasing order of the schedule priority, a second physical disk to schedule from one of the first schedule subgroup and the second schedule subgroup.

5. The method according to claim 1, further comprising:
   virtualizing the plurality of physical disks as a plurality of virtual disks; and
   wherein selecting comprises:
      in response to at least one virtual disk of the plurality of virtual disks receiving an I/O request, selecting a second physical disk from one of the resulting schedule groups in a decreasing order of the schedule priority;
      providing a map from the at least one virtual disk to the selected second physical disk; and
      dispatching the received I/O request to the selected second physical disk based on the map.

6. The method according to claim 5, further comprising:
   dividing address space of each of the physical disk into a plurality of chunks, each of the plurality of chunks having a same storage capacity; and
   dividing address space of each of the plurality of virtual disks into a plurality of blocks, each of the plurality of blocks having a same storage capacity as each of the plurality of chunks.

7. The method according to claim 6, wherein providing a map from the at least one virtual disk to the selected second physical disk comprises providing a map from blocks of the at least one virtual disk to chunks of the selected physical disk; and
   wherein dispatching the received I/O request to the selected second physical disk based on the map comprises dispatching the received I/O request to the chunks of the selected physical disk based on the map.

8. The method according to claim 1, wherein dividing the plurality of physical disks at least into a first schedule group and a second schedule group comprises:
   comparing the statistic number of a predetermined type of active I/O requests for a predetermined time period with a predetermined threshold;
   in response to the statistic number of the predetermined type of the active I/O requests of one or more of the plurality of physical disks exceeding the predetermined threshold, dividing the one or more physical disks into the first schedule group; and
   in response to the statistic number of the predetermined type of the active I/O requests of one or more of the plurality of physical disks failing to exceed the predetermined threshold, dividing the one or more physical disks into the second schedule group.

9. A system, comprising:
   a de-clustered disk array including a plurality of physical disks; and
   computer-executable program logic encoded in memory of one or more computers enabled to improve performance of the de-clustered disk array, wherein the computer-executable program logic is configured for the execution of:
      generating statistics on a number and types of active input/output (I/O) requests of each of the plurality of physical disks;
      dividing the plurality of physical disks at least into a first schedule group and a second schedule group based on the generated statistics on the number and the types of the active I/O requests of each of the physical disk for a predetermined time period, the first schedule group having a first schedule priority, the second schedule group having a second schedule priority, wherein the second schedule priority is higher than the first schedule priority; and
      selecting, in a decreasing order of the schedule priority, a first physical disk to schedule from one of the resulting schedule groups;
      collecting information on bad stripes under data reconstruction;
      identifying physical disks with data reconstruction I/O requests in the second schedule group based on the collected information on the bad stripes;
      dividing the physical disks in the second schedule group into a first subgroup and a second subgroup based on the identifying, wherein physical disks in the first subgroup having the data reconstruction I/O requests, and physical disks in the second subgroup not having the data reconstruction I/O requests; and assigning a third schedule priority to the second subgroup, the third schedule priority being higher than the second schedule priority.

10. The System of claim 9, wherein selecting comprises:
randomly selecting the first physical disk from one of the resulting schedule groups for schedule.

11. The System of claim 10, wherein the computer-executable program logic is further configured for the execution of:
periodically updating the number and types of the active I/O requests of each of the physical disk; and
causing, based on the updated number and types of the active I/O requests, at least a portion of the plurality of physical disks to move between different schedule groups of the resulting schedule groups.

12. The System of claim 9, wherein the computer-executable program logic is configured for the execution of:
in response to determining that the first physical disk is selected from the second schedule group, selecting, in a decreasing order of the schedule priority, a second physical disk to schedule from one of the first schedule subgroup and the second schedule subgroup.

13. The System of claim 9, wherein the computer-executable program logic is configured for the execution of:
virtualizing the plurality of physical disks as a plurality of virtual disks; and
wherein selecting comprises:
in response to at least one virtual disk of the plurality of virtual disks receiving an I/O request, selecting a second physical disk from one of the resulting schedule groups in a decreasing order of the schedule priority;
providing a map from the at least one virtual disk to the selected second physical disk; and
dispatching the received I/O request to the selected second physical disk based on the map.

14. The System of claim 13, wherein the computer-executable program logic is configured for the execution of:
dividing address space of each of the physical disk into a plurality of chunks, each of the plurality of chunks having a same storage capacity; and
dividing address space of each of the plurality of virtual disks into a plurality of blocks, each of the plurality of blocks having a same storage capacity as each of the plurality of chunks.

15. The System of claim 14, wherein providing a map from the at least one virtual disk to the selected second physical disk comprises providing a map from blocks of the at least one virtual disk to chunks of the selected physical disk; and
wherein dispatching the received I/O request to the selected second physical disk based on the map comprises dispatching the received I/O request to the chunks of the selected physical disk based on the map.

16. The System of claim 9, wherein dividing the plurality of physical disks at least into a first schedule group and a second schedule group comprises:
comparing the statistic number of a predetermined type of active I/O requests for a predetermined time period with a predetermined threshold;
in response to the statistic number of the predetermined type of the active I/O requests of one or more of the plurality of physical disks exceeding the predetermined threshold, dividing the one or more physical disks into the first schedule group; and
in response to the statistic number of the predetermined type of the active I/O requests of one or more of the plurality of physical disks failing to exceed the predetermined threshold, dividing the one or more physical disks into the second schedule group.

17. A computer program product for improving performance of a de-clustered disk array, the de-clustered disk array comprising a plurality of physical disks, the computer program product comprising:
a non-transitory computer readable medium encoded with computer-executable code, the code configured to enable the execution of:
generating statistics on a number and types of active input/output (I/O) requests of each of the plurality of physical disks;
dividing the plurality of physical disks at least into a first schedule group and a second schedule group based on the generated statistics on the number and the types of the active I/O requests of each of the physical disk for a predetermined time period, the first schedule group having a first schedule priority, the second schedule group having a second schedule priority, wherein the second schedule priority is higher than the first schedule priority; and
selecting, in a decreasing order of the schedule priority, a first physical disk to schedule from one of the resulting schedule groups;
collecting information on bad stripes under data reconstruction;
identifying physical disks with data reconstruction I/O requests in the second schedule group based on the collected information on the bad stripes;
dividing the physical disks in the second schedule group into a first subgroup and a second subgroup based on the identifying, wherein physical disks in the first subgroup having the data reconstruction I/O requests, and physical disks in the second subgroup not having the data reconstruction I/O requests; and
assigning a third schedule priority to the second subgroup, the third schedule priority being higher than the second schedule priority.

18. The computer program product of claim 17, wherein selecting comprises:
randomly selecting the first physical disk from one of the resulting schedule groups for schedule.

* * * * *